H. W. FELLOWS.
POWER TRANSMISSION.
APPLICATION FILED MAY 27, 1907.

954,384.

Patented Apr. 5, 1910.

2 SHEETS—SHEET 1.

Witnesses:
Frank L. Alpham
Louis W. Gratz

Inventor,
Hugh W. Fellows:
by Townsend, Hackley & Wright
His attys.

H. W. FELLOWS.
POWER TRANSMISSION.
APPLICATION FILED MAY 27, 1907.
954,384.
Patented Apr. 5, 1910.
2 SHEETS—SHEET 2.
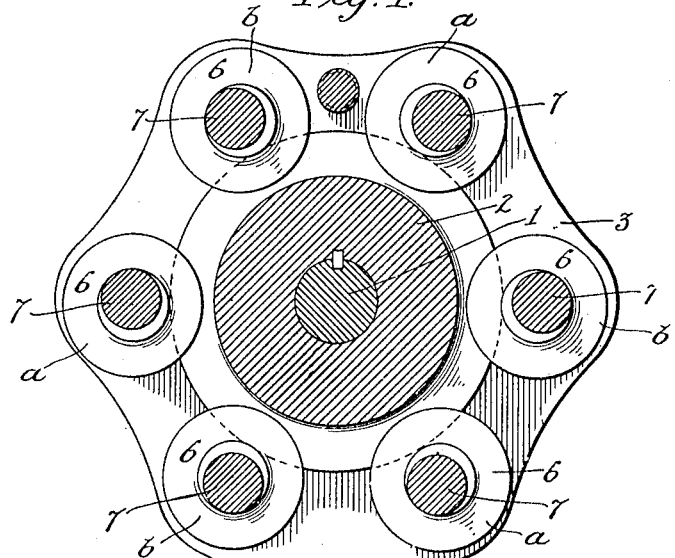
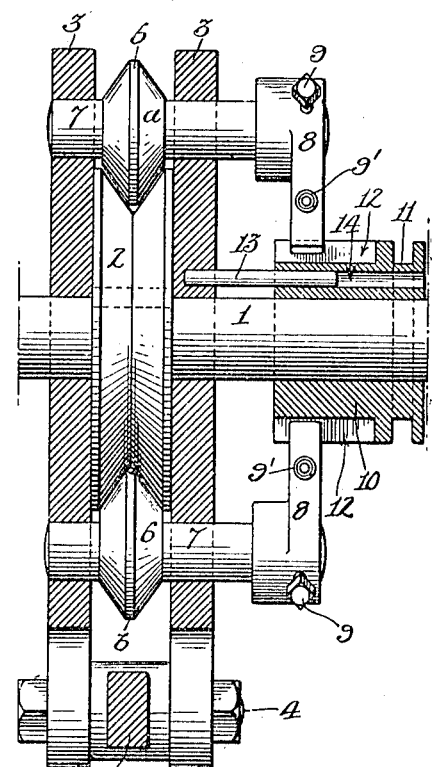
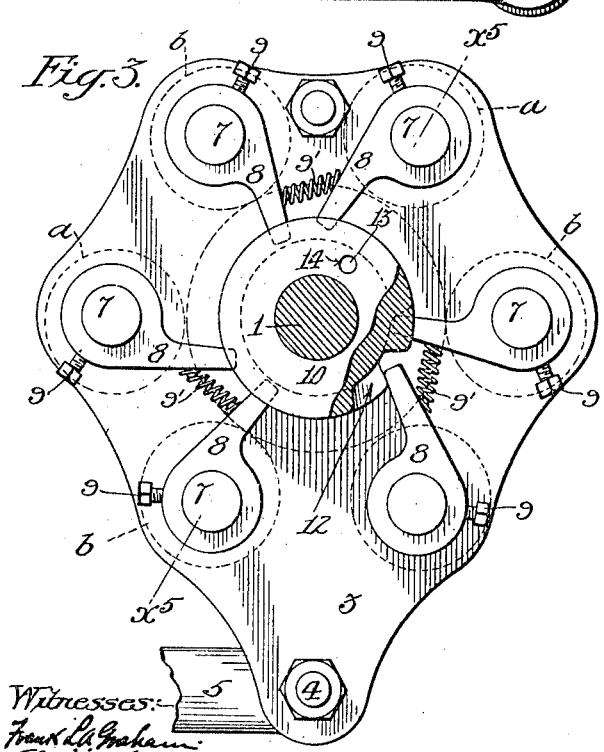
Inventor,
Hugh W. Fellows.

UNITED STATES PATENT OFFICE.

HUGH W. FELLOWS, OF CAHUENGA, CALIFORNIA, ASSIGNOR TO FELLOWS DIRECT POWER TRANSMISSION COMPANY, OF LOS ANGELES, CALIFORNIA, A CORPORATION OF ARIZONA TERRITORY.

POWER TRANSMISSION.

954,384.  Specification of Letters Patent.  Patented Apr. 5, 1910.

Application filed May 27, 1907. Serial No. 376,026.

*To all whom it may concern:*

Be it known that I, HUGH W. FELLOWS, a citizen of the United States, residing at Cahuenga, in the county of Los Angeles and State of California, have invented a new and useful Power Transmission, of which the following is a specification.

This invention relates to variable speed power transmissions in which the power is applied through the medium of an intermittent grip device and the speed is controlled by varying the angular stroke of the intermittent grip device, and the objects of the invention are to simplify the mechanism for varying the stroke of the intermittent grip device and provide a mechanism which is effective in operation and of economical construction.

The transmission is adapted for the propulsion of vehicles, or machinery, particularly where maximum power without excessive speed is required.

The intermittent grip device referred to is described and claimed in a previous patent of mine, No. 928,434, July 20, 1909.

Figure 1:
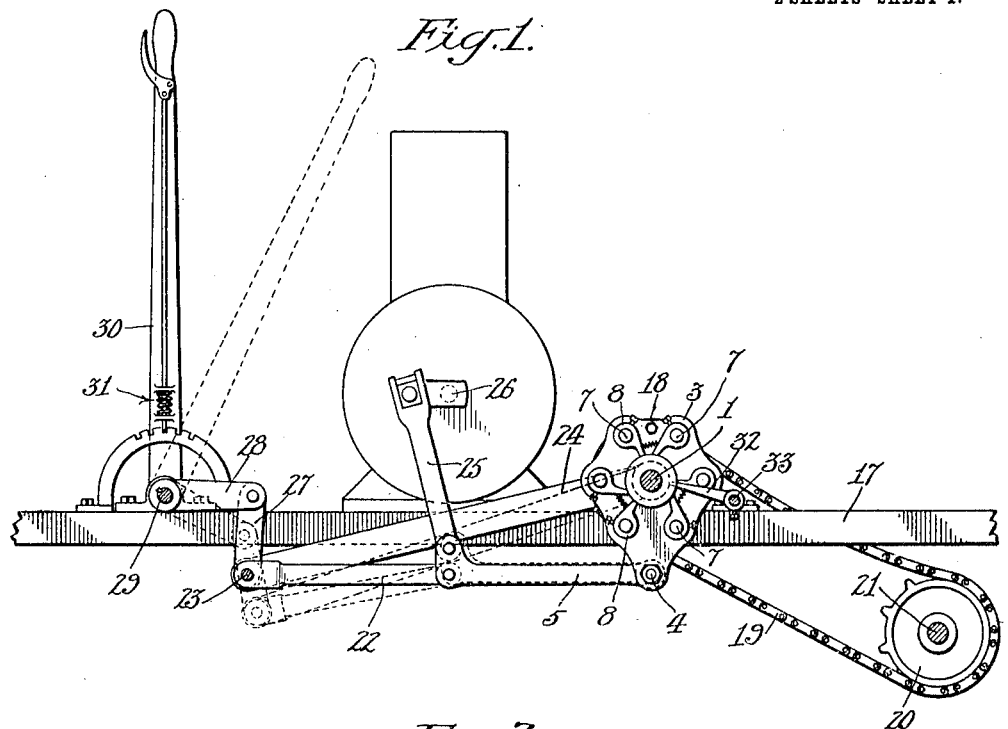
Figure 2:
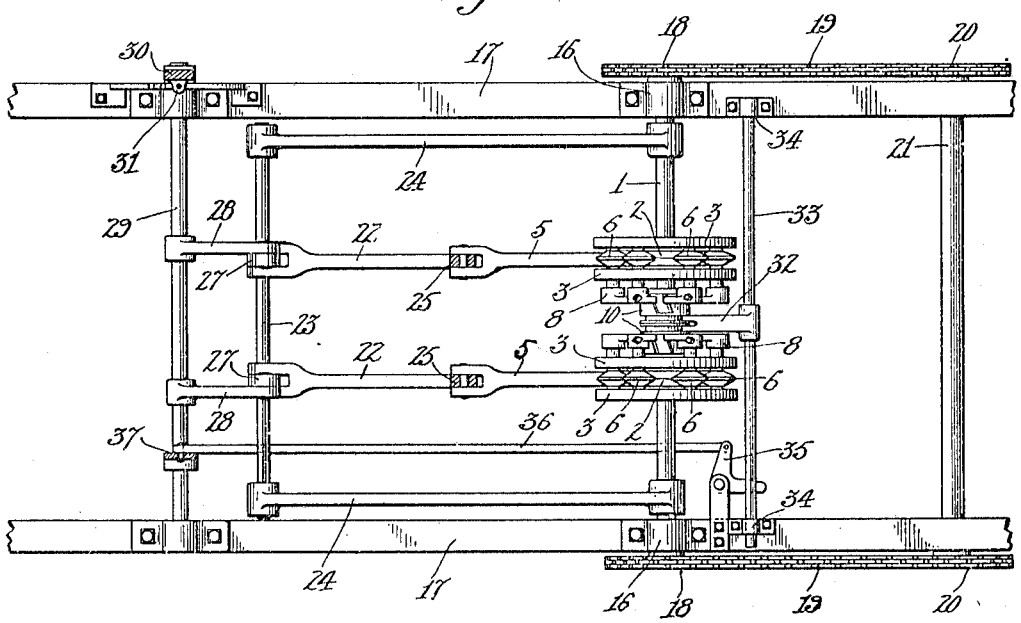

The accompanying drawings illustrate the invention, and referring thereto:—Figure 1 is a side elevation of the invention as applied to the frame of a motor vehicle, the nearest bar of the frame being removed. Fig. 2 is a plan view of the device. Fig. 3 is a side elevation of the intermittent grip device with a portion of the controlling sleeve broken away. Fig. 4 is a view similar to Fig. 1 with the controlling sleeve, fingers and nearest plate removed. Fig. 5 is a section on line $x^5$—$x^5$ Fig. 3.

The intermittent grip device with which the invention is combined is shown in detail in Figs. 3, 4 and 5 and comprises a driven shaft 1 upon which is keyed a disk 2, the periphery of which has a V groove.

Mounted loosely on the shaft 1 on each side of the disk 2 are side plates 3, the lower ends of which are connected by a bolt 4 to which is pivoted the end of an operating rod 5. A series of rollers 6 are arranged between the plates 3, each roller being mounted on a shaft 7 and the shafts 7 being journaled in the plates 3. Each roller 6 is eccentrically mounted on its shaft 7, as clearly seen in Fig. 2, and the rollers are arranged in two sets, three of the rollers *a* having their eccentric center at one side of a radius drawn from shaft 1 and the other three rollers *b* having their eccentric center at the other side of a radius drawn from shaft 1. The eccentric center of each roller 6 is adjustable by rocking its shaft 7 and the rollers 6 are adapted to grip in the V groove in the disk 2, or to roll idly therein, or to lie free therefrom as will be described.

In Fig. 3 the dotted lines show rollers *b* in engagement with the disk and rollers *a* out of engagement with the disk.

Mounted on the end of each shaft 7 is a finger 8, a set screw 9 serving to hold it adjustably on the shaft, and the fingers 8 are arranged in pairs, one finger 8 of one pair being attached to the shaft of a roller *a* and the other finger of a pair being attached to the adjacent roller *b*, and the two fingers of a pair are connected by a coil tension spring 9.

Mounted to rock and slide on shaft 1 is a controlling sleeve 10 having a grooved collar 11 adapted to be engaged by a forked lever, not shown, for operating the sleeve, and the sleeve is rifled to form three spiral grooves 12. The two fingers of each pair rest in the spiral groove associated therewith. A pin 13 carried by one of the plates 3 projects into a longitudinal hole 14 in the sleeve 10 and serves to oscillate the sleeve in unison with the plates 3 and yet permits the sleeve to be adjusted slightly along the shaft 1. By sliding the sleeve 10 on shaft 1, the fingers 8 which engage in the spiral grooves of the sleeve may be adjusted to regulate the angular position of the eccentric rollers. Thus, when the sleeve 10 is moved in one direction the fingers of one set of rollers are rocked so that those rollers are free from the grooved disk 2, while the other set of rollers are moved into contact with the grooved disk, and when so adjusted the plates 3, as they rock in one direction, cause the rollers which are in contact with the grooved disk 2 to grip tightly and wedge in the groove in the disk, which results in turning the disk 2 and shaft 1 at an angular speed equal to that of the plates 3. This gripping effect is much greater by reason of the V-shaped contact which affords a wedging effect due to the pressure of the contacting rollers, and the eccentricity of the contacting rollers is such that they have a tendency to roll in and increase the combined gripping and wedging effect. During the back stroke of the plates 3, the contacting rollers roll freely back over the disk 2 without exerting any wedging or gripping effect, as their eccentricity is on the opposite side and there is nothing to cause the rollers to roll into tight engagement, their tendency being to turn the opposite way which loosens the engagement. Thus, during each forward stroke the shaft 1 is operated forward, and during each back stroke the shaft 1 may turn under its momentum or by power derived from another clutch. By moving the sleeve 10 into its opposite position the relative adjustments of the two sets of rollers are reversed with the result that the disk 2 is driven in the opposite direction, inasmuch as the eccentricity of the contacting rollers lies on the other side of their radii of shaft 1. By moving the sleeve 10 into a central position, both sets of rollers are adjusted so that all of the rollers are out of contact with the disk 2, and when in this position the oscillations of the plates 3 have no operative effect on the shaft 1 and the latter is free to turn in either direction. During the oscillations of the plates 3 the sleeve 10 operates in unison therewith, but there is no relative movement imparted to the fingers 8 until the sleeve 10 is shifted longitudinally.

The shaft 1 is mounted in journals 16 on the frame 17 of the vehicle, each end of the shaft 1 carrying sprockets 18 which may be connected by chains 19 with sprockets 20 on a rear shaft 21. Two intermittent grip devices are mounted on shaft 1 for driving the same and the connecting rod 5 of each, forms one member of a toggle, the other member of each toggle being formed by an arm 22. Each arm 22 at its rear end is pivoted to a shaft 23, the latter being supported at each end by radius rods 24, the forward ends of the radius rods 24 being journaled on shaft 1. The rear end of each arm 5 has an offset knuckle to which is articulated a connecting rod 25 driven from the crank shaft 26. The radius rods 24 and shaft 23 form a rock frame which may be swung up or down to adjust the amount of stroke imparted by the toggle to the intermittent grip devices as will be described. This rock frame is operated by links 27 connected with arms 28 keyed to a rock shaft 29, the rock shaft 29 being operated by a hand lever 30, the latter being provided with suitable latch mechanism 31 for holding the hand lever in the position set. The two intermittent grip devices are arranged close together so that the two controlling sleeves 10 are engaged by a double forked lever 32 which is fixed on a sliding shaft 33, the latter being mounted in guide blocks 34 and being operated by a bell crank lever 35, a connecting rod 36 extending from the bell-crank lever 35 to a hand lever 37 mounted on the shaft 29, and the hand lever may be of similar construction to the hand lever 30.

When the rock frame is adjusted by the hand lever 30 to mid position, as shown in Fig. 1, the arms 5 and 22 of the toggle extend in a straight line between shaft 23 and their connection at the intermittent grip devices at mid stroke. The cranks of crank shaft 26 are set 180 degrees apart, so that as the crank shaft rotates, while the knuckle joint of one toggle moves up, the knuckle joint of the other toggle will be moved down. As one toggle is flexed upwardly it draws back its intermittent grip device idly. As the knuckle joint of the toggle descends to mid position, the intermittent grip device associated therewith is moved through its working stroke; as the knuckle joint of the toggle flexes below the center line the intermittent grip device is given its next idle stroke, and as the knuckle joint of the toggle again moves up to mid position the intermittent grip device is given its second working stroke. Thus each intermittent grip device is actuated through two complete strokes for each revolution of the crank shaft 26. This double action of the intermittent grip device, however, only takes place when the rock frame, comprising radius rods 24 and shaft 23, is adjusted so that the toggle has a movement both above and below a straight line through the three joints of the toggle. When the rock frame is moved down sufficiently low the two arms of the toggle will stand in a straight line when the associated crank is in its lowest position, and thus when so adjusted intermittent grip device will have but one working stroke imparted to it for each revolution of the crank shaft, but the length of the stroke of the intermittent grip device will be maximum. The amount of stroke imparted to each intermittent grip device is varied by adjusting the elevation of shaft 23, so that although the knuckle joint of each toggle always has the same length of stroke, the spreading effect of the toggle will be varied according to the position to which shaft 23 is adjusted. For example, when the parts are adjusted as shown in full lines in Fig. 2, the toggle will be operated for an equal distance above and below the center line and the minimum length of stroke is imparted to the intermittent grip device. This minimum stroke is extremely low, but not absolutely *nil*, and this stroke is increased by either raising or lowering the shaft 23 until the maximum stroke is produced.

Absolute stoppage is effected by operating the hand lever 37 to shift the rod 33 and operate the controlling sleeves 10 to release all of the rollers from their contact with disks 2. Reversal of the operative relation of the clutches to the shaft 1 is accomplished in the manner before described.

What I claim is:—

1. In a power transmission, an intermittent grip device, a toggle having one end connected thereto, means connected to the knuckle of the toggle for operating the toggle to oscillate the grip device, a rock frame journaled concentrically with the grip device, the free end of the rock frame supporting the other end of the toggle, and means for adjusting the angular position of the rock frame to vary the stroke imparted to the grip device by the toggle.

2. In a power transmission, an intermittent grip device, a toggle having one end connected thereto, means connected to the knuckle of the toggle for operating the toggle to oscillate the grip device, a rock frame supporting the other end of the toggle, a shaft, an arm on the shaft, a link connecting the arm and the free end of the rock frame, and a hand lever on the shaft.

3. In a power transmission, a shaft, a plurality of intermittent grip devices mounted thereon, toggles connected at one end with the respective grip devices, a rock frame journaled concentric with said shaft, the free end of the rock frame supporting the other ends of the toggles, a crank shaft having cranks set angularly to each other, connecting rods from the respective cranks to the respective knuckle joints of the toggles, means for adjusting the free end of the rock frame.

4. In a power transmission, a shaft, a plurality of intermittent grip devices mounted thereon, toggles connected at one end with the respective grip devices, a rock frame journaled concentric with said shaft, the free end of the rock frame supporting the other ends of the toggles, a crank shaft having cranks set angularly to each other, connecting rods from the respective cranks to the respective knuckle joints of the toggles, means for adjusting the free end of the rock frame, a slide rod parallel with said shaft, means for reversing the operative relation of the grip devices to said shaft, an arm on the slide rod connected with said reversing means, a bell crank lever for shifting the slide rod, and a hand lever connected with the bell crank lever for operating the same.

In testimony whereof, I have hereunto set my hand at Los Angeles, California, this 20th day of May 1907.

HUGH W. FELLOWS.

In presence of—
GEORGE T. HACKLEY,
FRANK L. A. GRAHAM.